US010033816B2

United States Patent
Rehaag et al.

(10) Patent No.: US 10,033,816 B2
(45) Date of Patent: *Jul. 24, 2018

(54) WORKFLOW SERVICE USING STATE TRANSFER

(71) Applicant: Amazon Technologies, Inc., Seattle, WA (US)

(72) Inventors: Aaron-Kenneth Karl Rehaag, Vancouver (CA); Zakiul Islam, Vancouver (CA); Xiaoming Wang, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/871,663

(22) Filed: Sep. 30, 2015

(65) Prior Publication Data

US 2017/0093988 A1    Mar. 30, 2017

(51) Int. Cl.
*G06F 15/16*      (2006.01)
*H04L 29/08*      (2006.01)
(Continued)

(52) U.S. Cl.
CPC .......... *H04L 67/142* (2013.01); *G06Q 10/00* (2013.01); *G06Q 10/06* (2013.01); *H04L 67/02* (2013.01);
(Continued)

(58) Field of Classification Search
CPC ... H04L 67/142; H04L 67/02; H04L 67/2842; G06Q 10/00
(Continued)

(56) References Cited

U.S. PATENT DOCUMENTS 6,041,306 A    3/2000  Du et al.
6,601,035 B1   7/2003  Panagos et al.
(Continued)

FOREIGN PATENT DOCUMENTS

WO    2001063446    8/2001
WO    2014035283    3/2014

OTHER PUBLICATIONS

International Search Report from PCT/US2016/054950, dated Jan. 2, 2017, Amazon Technologies, Inc., pp. 1-11.
(Continued)

*Primary Examiner* — David Lazaro
*Assistant Examiner* — Zi Ye
(74) *Attorney, Agent, or Firm* — Robert C. Kowert; Meyertons, Hood, Kivlin, Kowert & Goetzel, P.C.

(57) ABSTRACT

A provider network for providing continuous workflow service for an open-ended number of workflows using non-persistent threads. In some cases, the provider network includes a workflow handling service and a workflow evaluation service. The workflow handling service may receive indications of task completion events related to respective workflows, and in turn may send non-blocking requests for workflow decisions from the workflow evaluation service. In generating a workflow decision, the workflow evaluation service may determine resources for executing a workflow evaluation thread for generating the workflow decision. Further, a given workflow evaluation thread may determine a workflow decision without relying on a previously stored state for a state machine corresponding to the workflow. In this way, a given workflow decision may be determined on different allocated resources at different points in time in maintaining the workflow.

20 Claims, 8 Drawing Sheets

(51) Int. Cl.
*G06F 17/30* (2006.01)
*G06Q 10/00* (2012.01)
*G06Q 10/06* (2012.01)

(52) U.S. Cl.
CPC .... *H04L 67/2842* (2013.01); *G06F 17/30424* (2013.01)

(58) Field of Classification Search
USPC ........................................... 709/205
See application file for complete search history.

(56) References Cited

U.S. PATENT DOCUMENTS

| | | | |
|---|---|---|---|
| 7,607,130 B2 | 10/2009 | Singh et al. | |
| 7,840,857 B2 | 11/2010 | Breiter et al. | |
| 8,001,429 B2 | 8/2011 | Breiter et al. | |
| 8,392,236 B2 | 3/2013 | Fung et al. | |
| 8,504,400 B2 | 8/2013 | Purcell et al. | |
| 9,141,345 B2 | 9/2015 | Armour et al. | |
| 2002/0170035 A1* | 11/2002 | Casati | G06F 11/3688 717/127 |
| 2002/0188653 A1* | 12/2002 | Sun | G06Q 30/018 709/201 |
| 2003/0153994 A1* | 8/2003 | Jin | G06Q 10/0633 700/99 |
| 2003/0181991 A1* | 9/2003 | Chau | G05B 19/41865 700/1 |
| 2004/0172445 A1* | 9/2004 | Singh | G06Q 10/10 709/200 |
| 2009/0070162 A1* | 3/2009 | Leonelli | G06Q 10/0633 705/7.27 |
| 2011/0239126 A1* | 9/2011 | Erickson, Jr. | H04N 21/2225 715/744 |
| 2013/0073724 A1 | 3/2013 | Parashar et al. | |
| 2014/0156518 A1* | 6/2014 | Kibler | G06F 9/5072 705/40 |
| 2014/0240745 A1 | 8/2014 | Boldt et al. | |
| 2016/0098662 A1* | 4/2016 | Voss | G06Q 10/06316 705/7.26 |

OTHER PUBLICATIONS

Wikipedia, "Business Process Model and Notation", Retrieved from URL: https://en.wikipedia.org/wiki/Business_Process_Model_and_Notation on May 5, 2016, pp. 1-14.
AWS, "Getting Set Up with Amazon SWF", Retrieved from URL: http://docs.aws.amazon.com/amazonswf/latest/developerguide/swf-dg/dev-amzn-swf-html on Jun. 2, 2016, pp. 1-3.
U.S. Appl. No. 15/191,313, filed Jun. 23, 2016, Haizhi Xu, et al.
U.S. Appl. No. 14/876,560, filed Oct. 6, 2015, Zakiul Islam, et al.

* cited by examiner

WORKFLOW SERVICE USING STATE TRANSFER

BACKGROUND

Web service providers, and provider networks in general, often allow customers to specify a workflow that accomplishes a set of computational tasks to solve a given computational problem, logistical problem, or generally any process that may be directed by a computer system.

Traditional approaches for providing workflow services usually rely on service based from a client system. However, such traditional approaches are inflexible in that to provide additional workflow services, the client system becomes a bottleneck. Further, traditional systems often dedicate a continuous allotment of computational resources per workflow. However, such a continuous allotment of computational resources becomes inefficient in the case that there are idle periods between computational activity for a given workflow.

Figure 1:
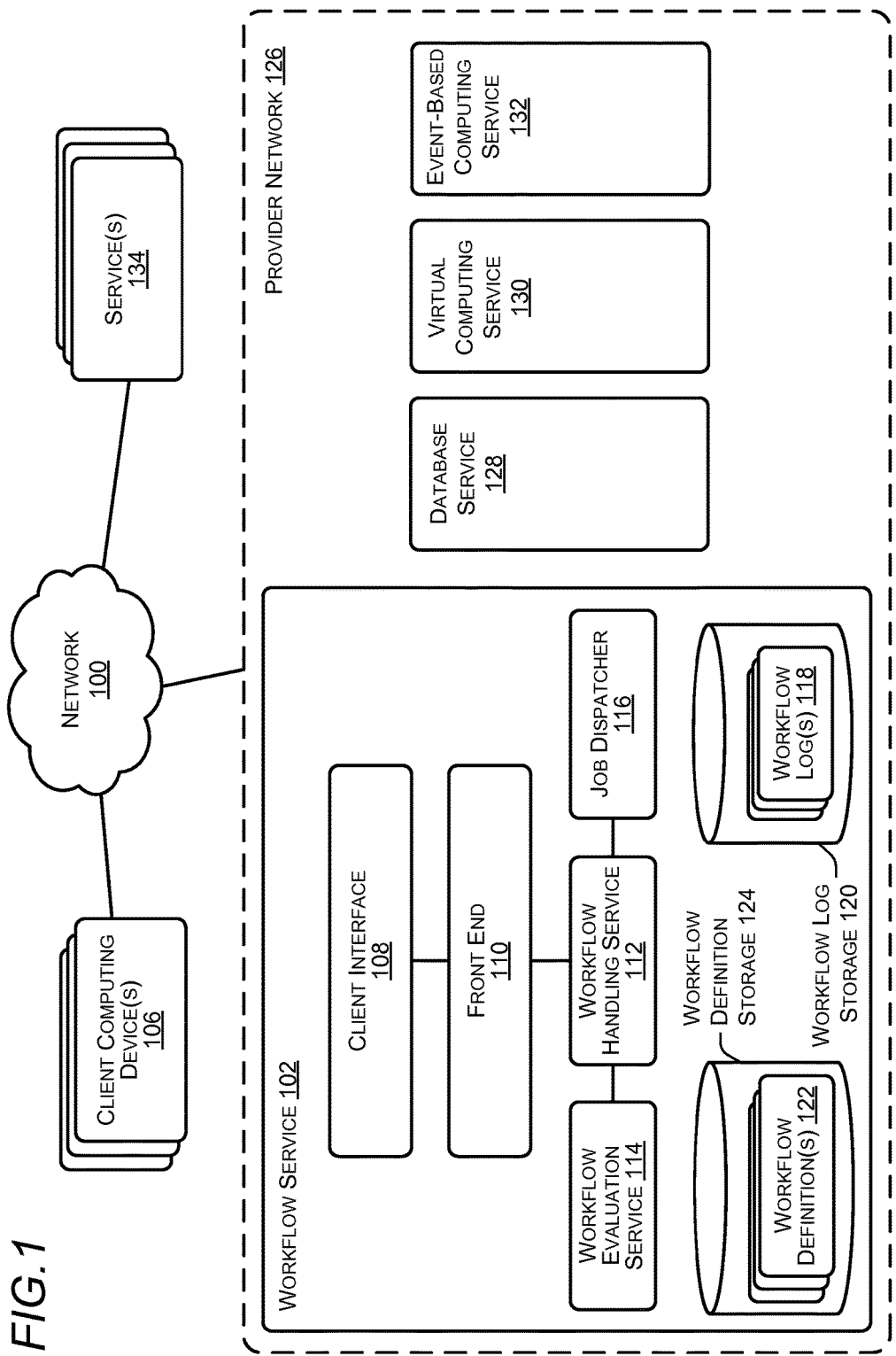
FIG. 1 is an illustrative architecture depicting an example workflow service within a provider network according to some implementations.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean inclusive of, but not limited to.

DETAILED DESCRIPTION

The systems and techniques described in this disclosure specify implementations of a workflow service for providing registration of workflow definitions and execution of a workflow corresponding to the workflow definition. Further, the architecture of the workflow service allows parallel execution of multiple different workflows across multiple host computers within a provider network. In particular, the workflow service provides continuous execution of given workflows without dedicating computing resources for executing the workflow in between states of the workflow, which allows different host computers within the provider network to work on a single given workflow at different points in time—and preventing idle dedication of computing resources for servicing a given workflow.

As an example, the workflow service may provide a client interface and a front end, where the client interface provides a platform for the creation and registration of a workflow definition for a workflow. Further, in some cases, the front end may validate a workflow definition, and if the workflow definition is valid, then the front end may provide the workflow definition to a workflow handling service to begin executing the workflow. In some cases, the workflow definition may be defined as a state machine, where given states of the state machine specify one or more tasks to be performed for the state, and a transition to other states of the state machine. In this way, as progress is made through different states of the state machine, different tasks corresponding to the workflow are executed. Further, one workflow definition may be used to create any number of workflow threads. For example, if the workflow definition is for a workflow for processing online orders for items to be fulfilled, then the same workflow definition may be used in creating a workflow for each given item ordered.

Continuing with this example, the workflow handling service may begin execution of the workflow corresponding to the workflow definition. For example, the workflow handling service may receive an indication from the front end to begin execution of the workflow, and in response, the workflow handling service may make a request to a workflow evaluation service to determine a next task to schedule for the workflow. Requests from the workflow handling service to the workflow evaluation service may be non-blocking, which allows the workflow handling service to continue to receive indications to advance other workflows without waiting for the response from the workflow evaluation service. Further, the requests may include a log of completed tasks related to the workflow. As noted above, a single workflow definition may correspond to multiple, different workflows, and in such cases, the workflow handling service may maintain a respective workflow log for each respective workflow.

In this example, the workflow evaluation service, for each given request from the workflow handling service for a decision corresponding to a given workflow, may create a workflow evaluation thread to determine the decision and continue to receive requests for decisions for other workflows as each workflow evaluation thread executes. Further, in some cases, different workflow evaluation threads may execute on different computing hosts of a provider network, or within different instantiated computing resources of a given computing host of the provider network. In different embodiments, a workflow evaluation thread may generally be considered a sequence or collection of program instructions whose execution may progress concurrently, in parallel, or in an interleaved manner with other workflow evaluation threads. In some embodiments, a workflow evaluation thread may be spawned, created, or allocated by a parent process or thread, such as the workflow evaluation service.

In other embodiments, a workflow evaluation thread may be a worker thread in a thread pool managed by a thread service.

Continuing with this example, for the workflow being initiated, the workflow evaluation thread, created by the workflow handling service in response to receiving the request for a decision, may construct a state machine for the workflow and determine a current state of the state machine. In this example, after evaluation the current state, the workflow evaluation thread may determine a next workflow decision and provide the workflow decision to the workflow handling service so that the workflow handling service may determine a corresponding task for the workflow decision and schedule the task for execution.

Further, the workflow handling service may log or record the workflow decision so that a subsequent workflow evaluation thread may determine a current state for the state machine corresponding to the workflow in order to determine a next workflow decision.

In this example, after the workflow evaluation thread completes, the workflow evaluation thread may terminate and any computing resources that were allocated for performing the workflow evaluation thread may be unallocated, or freed, for use. In this example, because each workflow evaluation thread terminates upon determining a workflow decision, a subsequent workflow evaluation thread—in order to determine a current state for the same workflow—uses the workflow log for a workflow to determine a current state of the state machine for the workflow.

In this way, for any given workflow, because a given workflow evaluation thread is provided with information for determining a current state of a workflow, a workflow evaluation thread does not need to persist in order to determine a current state of a workflow. Thereby preventing idle allocation of computing resources in providing continuous workflow execution.

FIG. 1 illustrates an example computing environment that includes an example embodiment of workflow service, workflow service 102. In this example, the workflow service is implemented within provider network 104. In this example, one or more clients, through one or more respective client computing devices 106 may access client interface 108 of the workflow service using network 100.

As discussed above, a client interface may provide a platform for the specification of a workflow definition. In some examples, the workflow specification may be specified in a development environment providing tools for using a programming language with domain specific language features for defining workflows. In some embodiments, such a domain specific language may include language features for specifying workflow states, workflow tasks, including serial or parallel tasks, workflow state transitions, and workflow error handling, among other features. In some examples, the development environment may also include tools for specifying some or all features of a workflow using graphical tools.

In some examples, the client interface may be provided through a website. In other cases, the client interface may provide an application programming interface for interfacing with a client-side application such as a development kit installation.

As depicted, the client interface may communicate with front end 110 of the workflow service, where the front end may validate the workflow definition and then register the workflow or indicate to the client computing device that a workflow definition failed to validate. While front end 110 and client interface 108 are depicted as separate for the purposes of clarity, the logical functionality of front end 110 and client interface 108 may be combined in different embodiments.

As depicted, workflow service 102 may also include workflow handling service 112, workflow evaluation service 114, and job dispatcher 116. In some embodiments, the logical functionality of a job dispatcher may be included within a workflow handling service instead of being a separate component of the workflow service. As discussed above, workflow handling service 112 may receive indications to either begin a workflow or to advance a workflow. For example, when a workflow is initially validated, the front end may indicate to the workflow handling service to begin execution of the workflow. In other cases, the workflow may have already been started, and the front end may provide to the workflow handling service an indication that a task corresponding to a given workflow has completed, and consequently, that a decision is to be made with regard to a next task to execute for the workflow.

As discussed above, to advance execution of a workflow, the workflow handling service may request a decision to be made for the workflow, where the decision is requested from the workflow evaluation service. Further, in some cases, the request from the workflow handling service may specify a workflow and a corresponding workflow log, where the workflow log may include previous events, completed tasks, or other information related to the workflow. As depicted, workflow logs 118 may be stored in workflow log storage 120.

In some cases, in response to a request from the workflow handling service for a decision for the workflow, the workflow evaluation service may access a workflow definition for the workflow. As depicted, workflow definitions 122 may be stored in workflow definition storage 124.

Further in this implementation, the workflow service may be one of multiple different services provided within a provider network, such as provider network 126. As depicted, other services may include database service 128, virtual computing service 130, and event-based computing service 132, among others. Further, in some embodiments, a database service, such as database service 128, may provide the storage services provided by workflow definition storage 124 and/or workflow log storage 120. More generally, any of the storage services used by the workflow service may be provided by either local storage, a storage service, or a combination of local storage and storage services.

In some embodiments, a workflow may be specified to use services provided entirely within provider network 126. However, in other examples, a workflow may be specified to use one or more services provided from a third party, for example, services 134. In some cases, a combination of provider network services and third party services may be used in the execution of a given workflow.

In this way, beginning with a client system specifying a workflow, a workflow service may begin executing the workflow in a manner that provides continuous workflow processing using multiple, discrete deployments of computation resources in a manner that avoids idle allocations of computing resources. Further, given that a given workflow may be serviced by a new processing thread each time the workflow is to be advanced, distribution of the computation for the processing threads may be spread across different computing hosts of the provider network to avoid computational bottlenecks and to allow for efficient scaling of the servicing of multiple different workflows.

Figure 2:
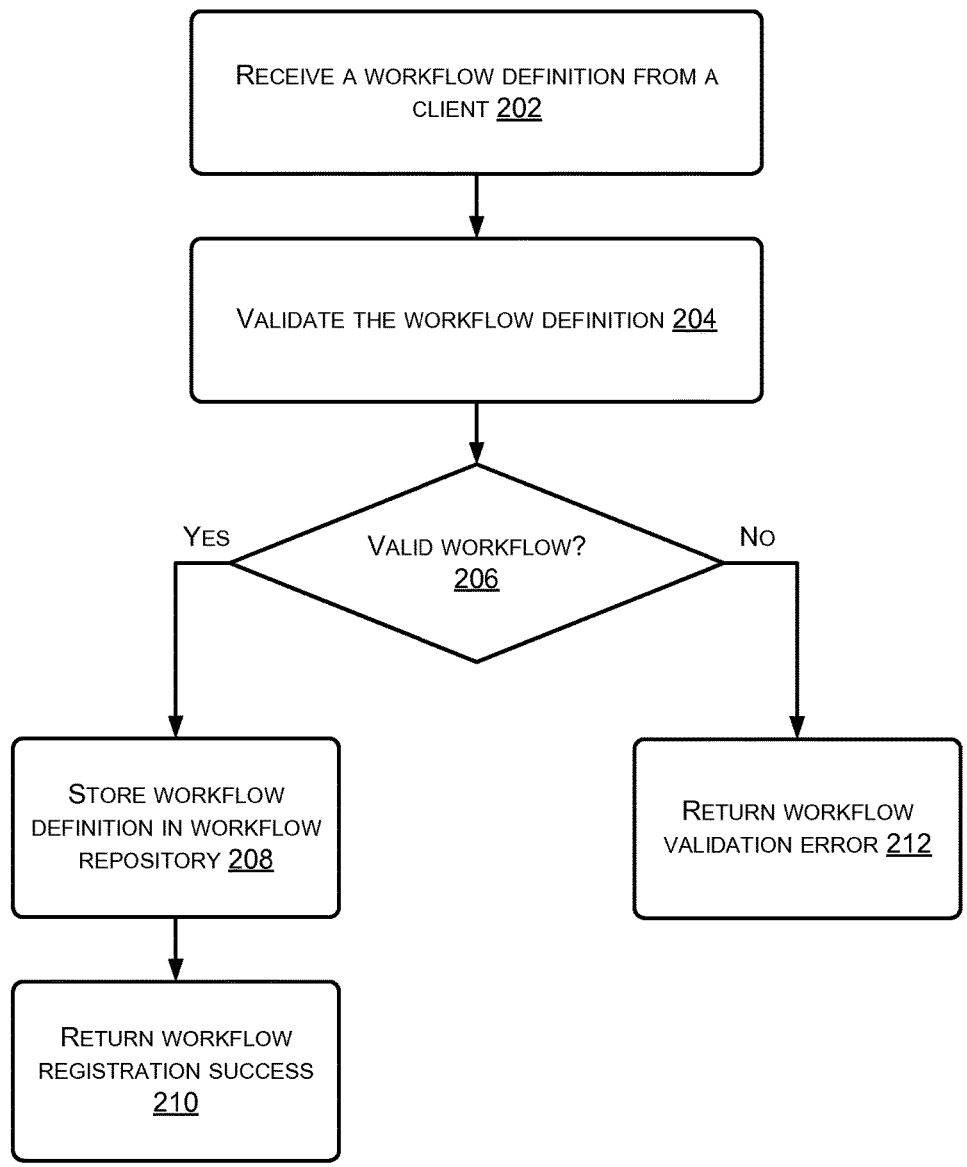
FIG. 2 is a flow diagram illustrating features of a registration and validation process for the workflow service according to some embodiments.

FIG. 2 illustrates flowchart 200 depicting example operations performed in a workflow service in receiving a workflow definition for a workflow. In this example, the workflow service may receive a workflow definition from a client, as depicted at 202. As discussed above, the workflow definition may be specified in a domain specific language that describes a state machine for the workflow, including tasks, transitions, error handling, a terminating condition, among others.

The workflow service, given a workflow definition, may validate the workflow definition, as depicted at 204. In some cases, the validation may include validating that certain types of error handling are valid, data flows between states of the workflow state machine are valid with regard to parameter inputs and outputs, including other forms of validation.

If the workflow definition is valid, and as depicted at 206, the workflow service may store the workflow definition in a workflow repository and return a workflow registration success message, as depicted at 208 and 210, respectively. Otherwise, if the workflow definition is not determined to be valid, the workflow service may return a workflow validation error, as depicted at 212.

Once a workflow definition is successfully registered, the workflow service may invoke the workflow handling service to begin execution of the workflow.

Figure 3:
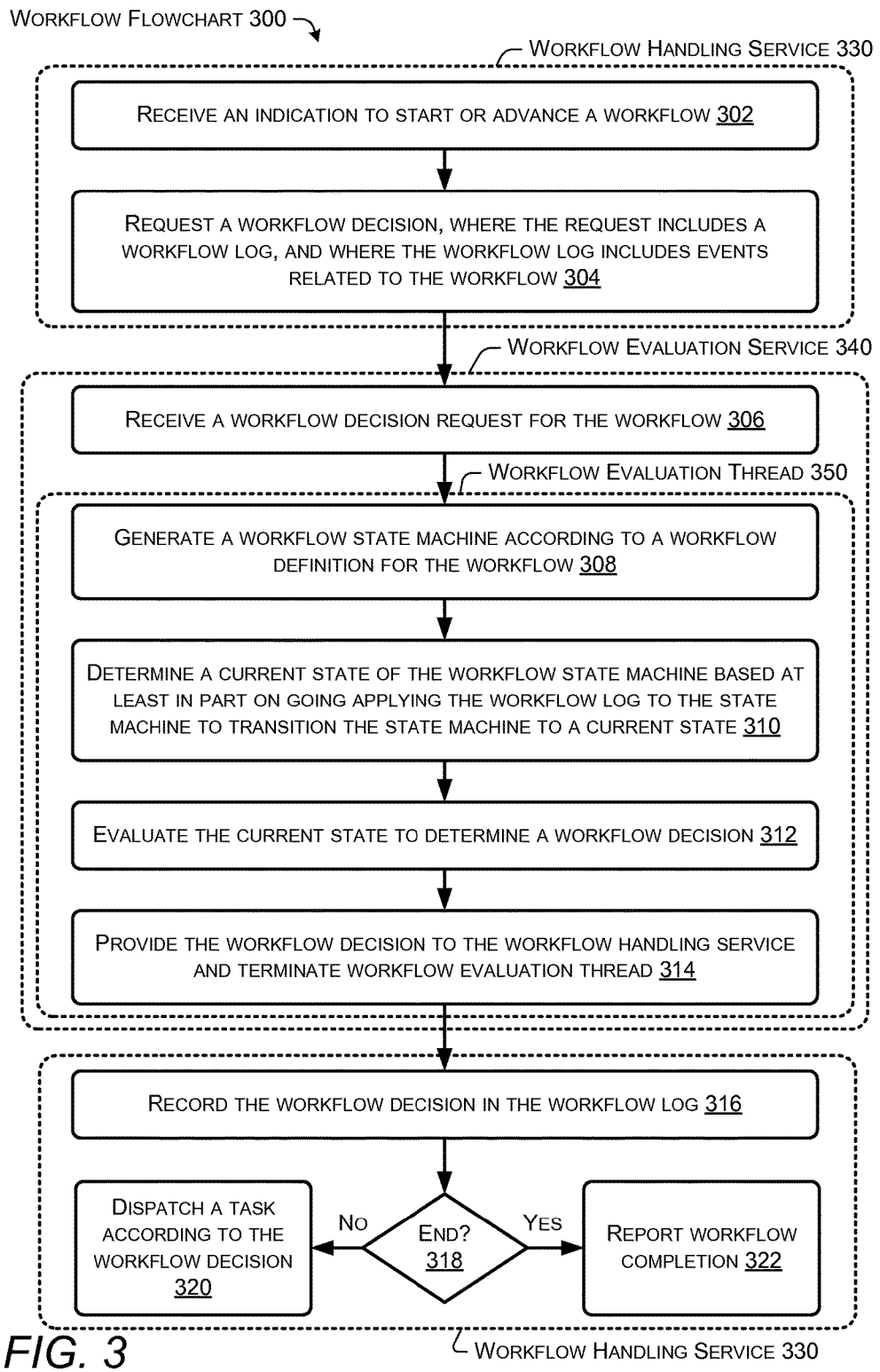
FIG. 3 is a flow diagram illustrating features of a workflow service according to some implementations.

FIG. 3 illustrates flowchart 300 depicting example operations performed in a workflow service in executing a workflow. As one example, workflow service 102 within provider network 126 may validate and register a workflow definition. As described with regard to FIG. 2, if the workflow definition is determined to be valid, the workflow handling service may be invoked to either begin executing or to advance the workflow. For example, front end 110, may call the workflow handling service with parameters indicating the workflow, and indicating that the workflow is to begin executing.

In this example, as depicted at 302, the workflow handling service may receive the call or indication to start the workflow. In other cases, once the workflow has begun executing, the workflow handling service may receive indications with regard to the already executing workflow describing a task completion event for the workflow. In such an instance, as depicted at 302, the workflow handling service may receive an indication to advance the workflow and also receive a description of, for example, a task that has completed for the workflow.

The workflow handling service may also log or record an indication of the event within a workflow log corresponding to the workflow. In this example, the workflow handling service may record an indication that the workflow was requested to begin executing or record an indication that a task for the workflow has completed. In other cases, the event may indicate a task failure, or some other status information related to the workflow, and the workflow handling service may record any and all information with regard to the workflow. Further, in some cases, the workflow handling service may log each recording of information with a sequence number or timestamp so that an order may be determined with regard to the logged information.

In this example, the workflow handling service, in response to receiving the indication to start or advance the workflow, may request a workflow decision from the workflow service, as depicted at 304. The request from the workflow handling service to the workflow service may include an indication of the workflow and the workflow log or a reference to the workflow log, where the workflow log may include events related to the workflow, as depicted at 304.

In this example, the operations performed by the workflow handling service are indicated within flowchart 300 by workflow handling service 330. The request for a workflow decision from workflow handling service 330 to the workflow evaluation service 340 may be a non-blocking request such that after the workflow handling service sends the request, the workflow handling service is available to process additional indications to start or advance other workflows while the workflow handling service 340 is processing a previous request. Further, workflow evaluation service 340 may receive a workflow decision request and create a workflow evaluation thread 350 to determine a workflow decision. In some cases, after the workflow evaluation service 340 creates and initiates a workflow evaluation thread 350, the workflow evaluation service is available to receive additional requests for additional workflow decisions. In this way, workflow evaluation service 340 may spawn any number of workflow evaluation threads to execute in parallel to determine any number of respective workflow decisions.

One effect of the workflow handling service using non-blocking requests and the workflow evaluation service spawning parallel workflow evaluation threads is that as increased numbers of workflows are created and serviced, there are no bottlenecks in the actual processing of the workflow decisions, but rather the limit is in how quickly the workflow handling service receives and sends requests for workflow decisions—which may be done efficiently since this is a small number of quick operations—and how quickly the workflow evaluation service receives and creates workflow evaluation threads—which, again, may be done efficiently since this is a small number of quick operations.

Continuing with this example, as depicted at 306, workflow evaluation service 340 may receive the workflow decision request for the workflow. In this example, the workflow decision request from the workflow handling service may include a workflow log for the workflow. Receiving the workflow log may effectively transfer state of the workflow to the workflow evaluation service. To determine a workflow decision, workflow service 340 may allocate computing resources on a host computer and create a workflow evaluation thread to determine the workflow decision, where the workflow evaluation thread may execute on the allocated computing resources. In this example, the host computer may be one of multiple different host computers available to the workflow evaluation service within the provider network.

The workflow evaluation thread, once created, may proceed to generate a state machine for the workflow, where the workflow is specified according to a workflow definition, as depicted at 308. In this example, the state machine is created from scratch and has no dependencies or reliance on previously generated state machines or previously determined workflow decisions. Given a created state machine, the workflow evaluation thread may determine a current state of the workflow based at least in part on applying the workflow log to the state machine to transition the state machine to a current state of the workflow, as depicted at 310. For example, an ordered list of completed tasks in the workflow log may be accessed, and the workflow evaluation thread may correspond each completed task with a transition in the state machine as indicated by transitions specified in the workflow definition. In this way, events logged in the workflow log, in correspondence with the workflow definition, may be used to transition from an initial state of a state machine for the workflow to a current state for the workflow.

Given a current state of the state machine for the workflow, the workflow evaluation thread may evaluate the current state to determine a workflow decision, as depicted at 312. For example, the workflow evaluation thread may determine, according to the workflow definition for the workflow, that at a current state, and given previously completed tasks, that a next decision includes a particular task, operation, or decision. The workflow evaluation thread may then provide the workflow decision to the workflow handling service, as depicted at 314.

The workflow handling service, in response to receiving the workflow decision from the workflow evaluation thread, may record the workflow decision in the workflow log, as depicted at 316. Further, the workflow handling service may determine, as depicted at 318, that the workflow decision corresponds to completion of the workflow or that the workflow decision corresponds to a task.

If the workflow decision corresponds to a task to be executed for processing the workflow, as depicted at 320, then the workflow handling service may dispatch a task according to the workflow decision. In other cases, the workflow handling service may instead provide the task to be performed to a job dispatcher, where the job dispatcher may schedule the task to be executed. At this point, if the workflow handling service is not servicing additional requests to advance other workflows, then the workflow handling service may wait for a task completion event, upon which the workflow handling service may begin again as depicted at 302.

If the workflow decision corresponds to completion of the workflow, as depicted at 322, then the workflow handling service may report completion of the workflow, for example, to the front end. In turn, the front end may notify a client of the completion of the workflow.

Figure 4:
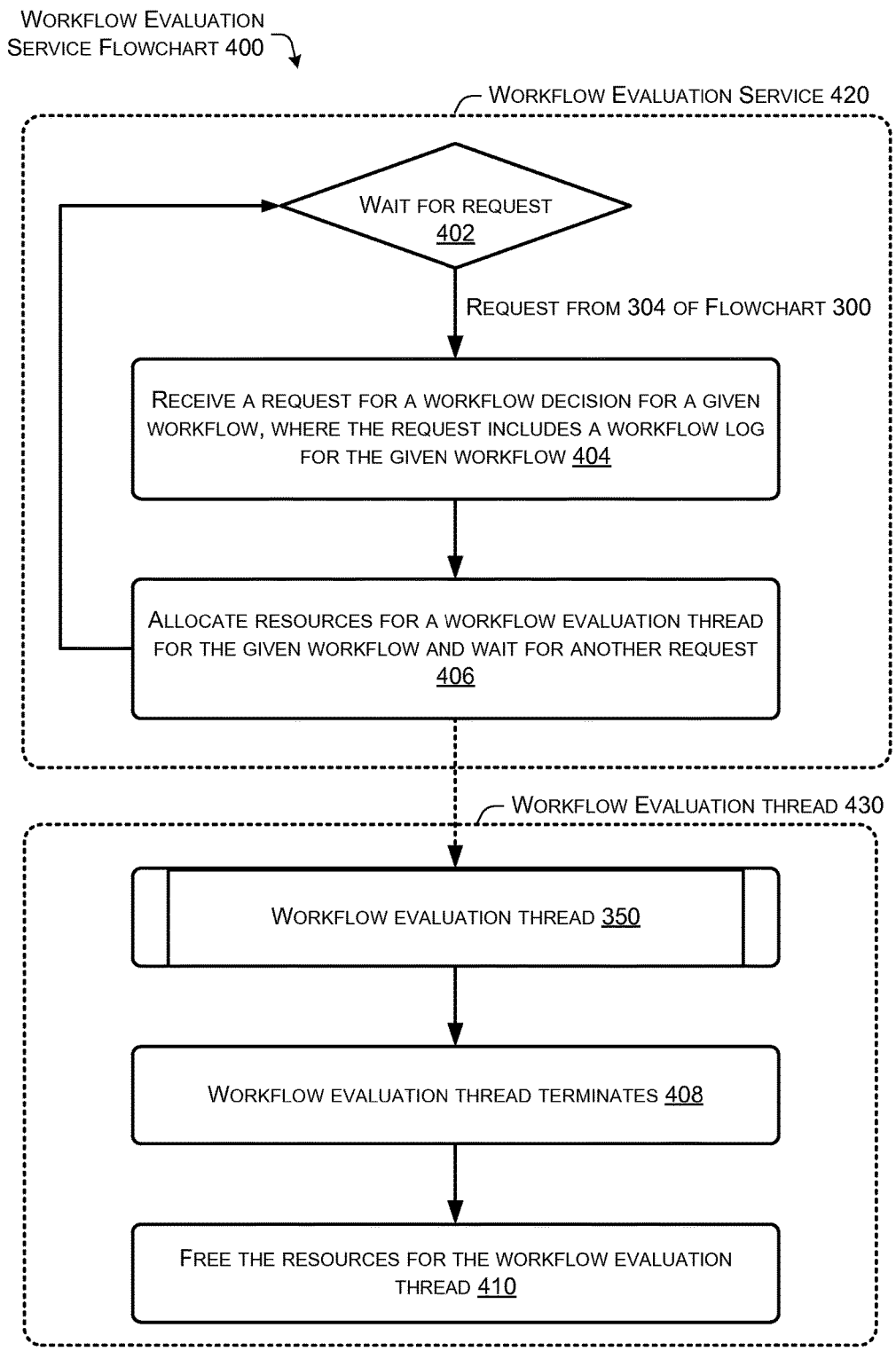
FIG. 4 is a flow diagram illustrating features of a workflow evaluation service of the workflow service according to some implementations.

FIG. 4 illustrates flowchart 400 depicting example operations performed by a workflow evaluation service. As discussed above with regard to FIG. 3, a workflow evaluation service may be workflow evaluation service 340. In between processing workflow decision requests, a workflow evaluation service may wait for request from the workflow handling service, as depicted at 402.

In this example, a request may be received from a workflow handling service, such as a request from 304 in flowchart 300 of FIG. 3. As depicted at 404, the workflow evaluation service may then receive the request for a workflow decision from the workflow handling service, where the request may include a workflow log for the workflow.

As described above with regard to FIG. 3, the workflow evaluation service, to determine a workflow decision, may allocate computing resources for executing a workflow evaluation thread that determines and returns the workflow decision to the workflow handling service, where after the workflow evaluation thread is created and initiated, the workflow evaluation service may wait for additional requests, as depicted at 406.

As described above with regard to FIG. 3, the workflow evaluation thread may proceed to determine a workflow decision for the workflow, including the operations 308-314 of FIG. 3. After the workflow evaluation thread provides the workflow handling service with a workflow decision, the workflow evaluation thread may terminate and the allocated computing resources used to execute the workflow evaluation thread may be freed, as depicted at 408 and 410. In this way, the allocated resources may be made available for processing other workflow decisions.

As discussed above, the allocated resources may be freed or unallocated because each time a request for a workflow decision is received, a workflow evaluation thread may determine, from scratch or entirely from the workflow log and workflow definition, a current state for the workflow and a next workflow decision.

Figure 5:
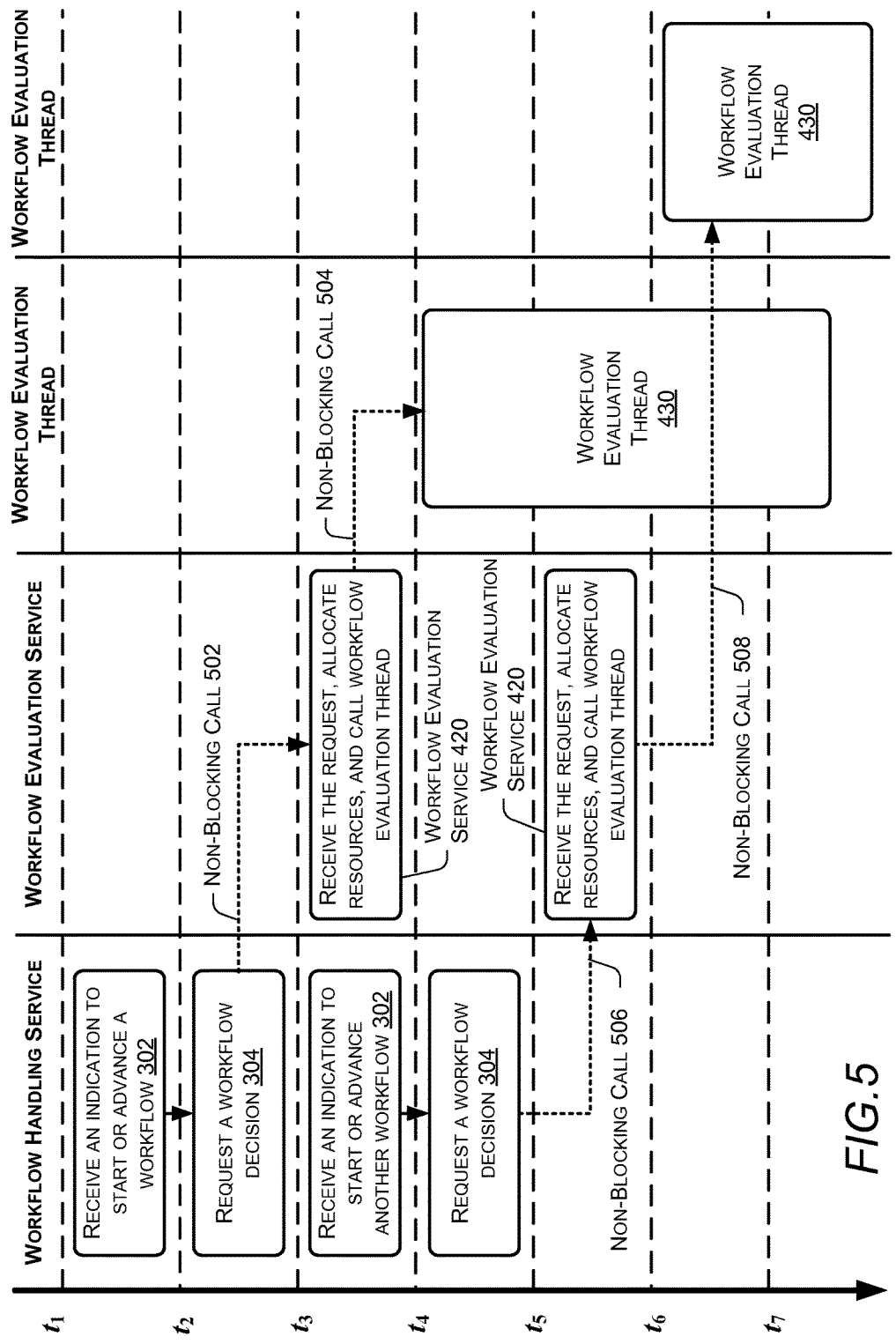
FIG. 5 is a flow diagram illustrating features of a workflow handling service and workflow evaluation service of a workflow service operating in parallel according to some implementations.

FIG. 5 illustrates parallel operations between the workflow handling service, the workflow evaluation service, and workflow evaluation threads discussed above with regard to FIGS. 2-4. In this example, the workflow handling service may receive an indication to start or advance a workflow, as depicted at 302 at time $t_1$, where 302 corresponds to the operations described above with regard to FIG. 3.

In this example, the workflow handling service may then request a decision for a workflow decision for a first workflow, as depicted at 304 at time $t_2$. Further, the request from the workflow handling service to the workflow evaluation service may be a non-blocking call, as depicted by non-blocking call 502. Given that the request for a workflow decision is non-blocking, as soon as the workflow handling service makes the request, the workflow handling service is available to process or receive additional requests, which in this example, is depicted at 302 at time $t_3$.

In this example, the request from the workflow handling service is received by the workflow evaluation service at time $t_3$, which as described above, is also approximately the time at which the workflow handling service receives another indication to start or advance another workflow. As depicted by workflow evaluation service 420 at time $t_3$, the workflow evaluation service may receive the request for a workflow decision, along with a workflow log, allocate computing resources for a workflow evaluation thread to determine the workflow decision and then proceed to initiate or call the workflow evaluation thread. In this example, the call to the workflow evaluation thread from the workflow evaluation service 420 at time t3 is depicted by non-blocking call 504.

As depicted at time t4, at this point, the workflow handling service has already received an indication to start or advance another workflow, and may then request a workflow decision via non-blocking call 506. Further at time t4, a workflow evaluation thread for determining a workflow decision for the first workflow has been started, as depicted by workflow evaluation thread 430 called by non-blocking call 504.

The request for a workflow decision for the other workflow at time t4 and via non-blocking call 506 may be received by workflow evaluation service 420 at time t5. Further at time t5, while the workflow evaluation service 420 is processing the request for the other workflow decision, the workflow evaluation thread 430 initiated at time t4 for the first workflow decision is still executing.

Further as depicted at time t5, after the workflow evaluation service 420 allocates computing resources for a workflow evaluation thread to determine the other workflow decision, the workflow evaluation service 420 may call the workflow evaluation thread 430 via non-blocking call 508.

As depicted at time t6, at this point, both workflow evaluation thread 430 initiated at time t4 to determine the first workflow decision and workflow evaluation thread 430 initiated at time t6 to determine the other workflow decision are executing. As described above, the different workflow evaluation threads may be executing on different allocated resources, and in some cases, the different allocated resources may be on different host computers of the provider network. In other cases, the different allocated resources may be on the same host computer of the provider network.

As discussed below in FIG. 6, a determination of what resources to use to execute the workflow evaluation threads may be made by a load balancer.

Figure 6:
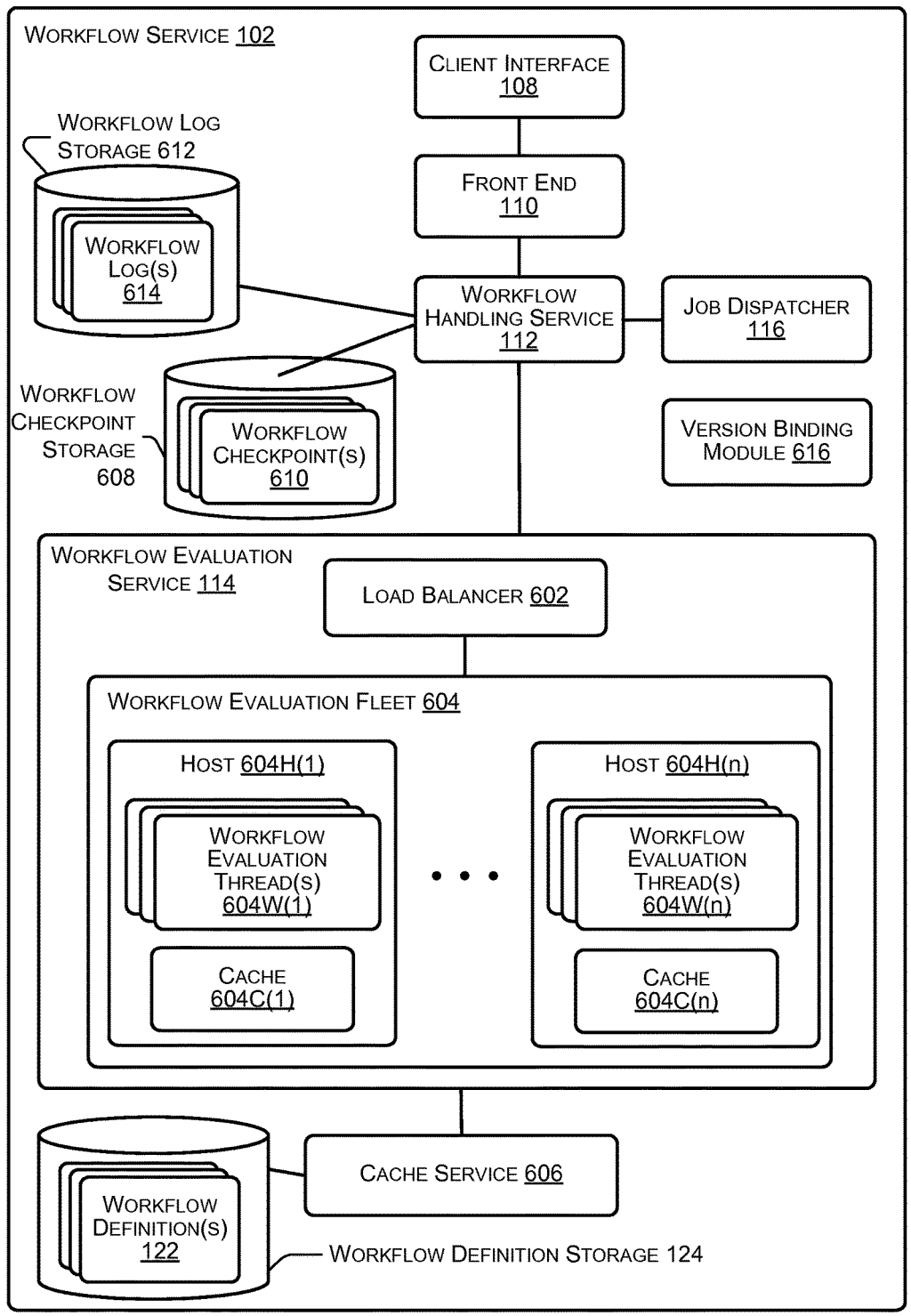
FIG. 6 is another illustrative architecture depicting an example workflow service within a provider network according to some implementations.

FIG. 6 illustrates an embodiment of workflow service 102 with additional possible features. In this embodiment, workflow service 102 includes, as depicted in FIG. 1, client interface 104, front end 110, workflow handling service 112, and job dispatcher 116. However, in this example, workflow evaluation service 114 includes a load balancer, load balancer 602, and a workflow evaluation fleet of host computers or systems, hosts 604H(1)-604H(n).

As discussed above with regard to FIG. 5, a workflow evaluation service may receive multiple requests from a workflow handling service for different workflow decisions for different workflows. In such an example, the workflow evaluation service may determine how to distribute processing of the workflow decisions. As depicted, the workflow evaluation service may include a load balancer that serves to receive multiple requests for workflow decisions, and to determine which computing resources to deploy for executing respective workflow evaluation threads for determining the workflow decisions.

In this example, the computing resources from among which the load balancer 602 may deploy for executing different workflow evaluation threads is depicted by workflow evaluation fleet 604. In this example, workflow evaluation fleet 604 may include multiple computing hosts, hosts 604H(1)-604H(n). Example workflow evaluation threads are depicted by workflow evaluation threads 604W(1)-604W(n).

In some embodiments, each of computing hosts 604H(1)-604H(n) may include a respective local cache, local caches 604C(1)-604C(n). While the examples discussed above with regard to FIGS. 1-5 describe workflow evaluation services and workflow evaluation threads that operate without persisting a current workflow state for a workflow from one instance of a workflow evaluation thread to a subsequent instance of a workflow evaluation thread, in some cases, while the workflow evaluation thread may terminate, the state machine created by the workflow evaluation thread may remain stored in a local cache for the host on which the workflow evaluation thread executed.

In some cases, for example in a workflow that quickly transitions between states of the state machine for the workflow, a state machine created by a workflow evaluation thread at, say, time $t_0$, may still reside in the local cache when a subsequent workflow evaluation thread executes at, say, time $t_n$. In different example, the local cache for a given host may store data according to different retention policies.

Further, in some instances, it may be that while a state machine for a given workflow may be in a local cache, say local cache 604C(1), when a subsequent workflow evaluation thread is initiated, the load balancer may deploy the subsequent workflow evaluation thread to execute on a different host and different local cache, for example host 604H(n) and local cache 604C(n). In such an example, the previously constructed state machine for the given workflow may not be available to the subsequent workflow evaluation thread even thought the state machine for the given workflow still resides in a different local cache.

To overcome such a situation, in some embodiments, the workflow evaluation service may use a cache service, such as cache service 606. Cache service 104 may be a distributed cache, and in some cases, cache service 606 may be the storage tier from which data in the host caches move data. For example, in the previous example, where a load balancer deploys a workflow evaluation thread to determine a workflow decision from host 604H(1), and the state machine for the workflow is stored in local cache 604C(1), the state machine may be flushed or copied from local cache 604C(1) into cache service 606.

In this way, in this example, at a subsequent time, when a subsequent workflow evaluation thread for the given workflow executes from a different host, the workflow evaluation thread may access the state machine for the workflow from the cache service 606. In such an example, the subsequent workflow evaluation thread may determine a workflow decision without constructing a state machine from the workflow definition.

In other embodiments, a workflow service may also use checkpoints to determine a current state of a state machine without transitioning through all states of the state machine from the initial state to a current state. For example, the workflow handling service may periodically or aperiodically store a checkpoint, where the checkpoint defines a particular state of the state machine up to a particular point in the workflow. In this example, a workflow evaluation thread may apply the checkpoint to the state machine to reach the particular state of the state machine. In some implementations, the checkpoint for a workflow may be received as a parameter of the request for a workflow decision and passed from the workflow evaluation service to the workflow evaluation thread. In other implementations, the workflow evaluation service or the workflow evaluation thread may access the checkpoint corresponding to a given workflow from a data store or database service. In this example, the workflow evaluation thread may then reference the workflow log to transition the state machine from the particular state to the current state of the state machine, for example. For example, the workflow evaluation thread may find an event in the workflow log corresponding to the checkpoint, and transition the state machine using events subsequent to the checkpoint up to a current event. Further in this example, the workflow checkpoints are indicated by workflow checkpoints 610.

Further, in this embodiment of workflow service 102, the workflow handling service may use a workflow log storage for maintaining current workflow logs, such as workflow log storage 612. As depicted, workflow log storage 612 may store workflow logs 614.

In some embodiments, workflow service 102 may also include a version binding module, such as version binding module 616. As described above, a single workflow definition may be used to create multiple instances of a workflow. In such an example, the processing for each different workflow still corresponds to the same workflow definition. However, in some cases, a version binding module may be used to correspond, or bind, different workflow definition versions with different instances of workflows. For example, a client may create a workflow definition and create a corresponding workflow. While this workflow is executing, the client may create an updated version of the workflow definition and create another workflow using the updated workflow definition. In this way, the other workflow using the updated workflow definition may be created and started while the workflow using the previous version of the workflow definition is still executing. In other words, a workflow definition version may be maintained and bound to an executing workflow for the execution life cycle of the workflow. Further, any number of workflows using different versions of may be concurrently executing, thus allowing for rolling releases of workflows for workflow definitions with different sets of features. In some examples, the front end of the workflow service may provide the user with choosing any given version, past or current, of a workflow definition from which to start a workflow.

Figure 7:
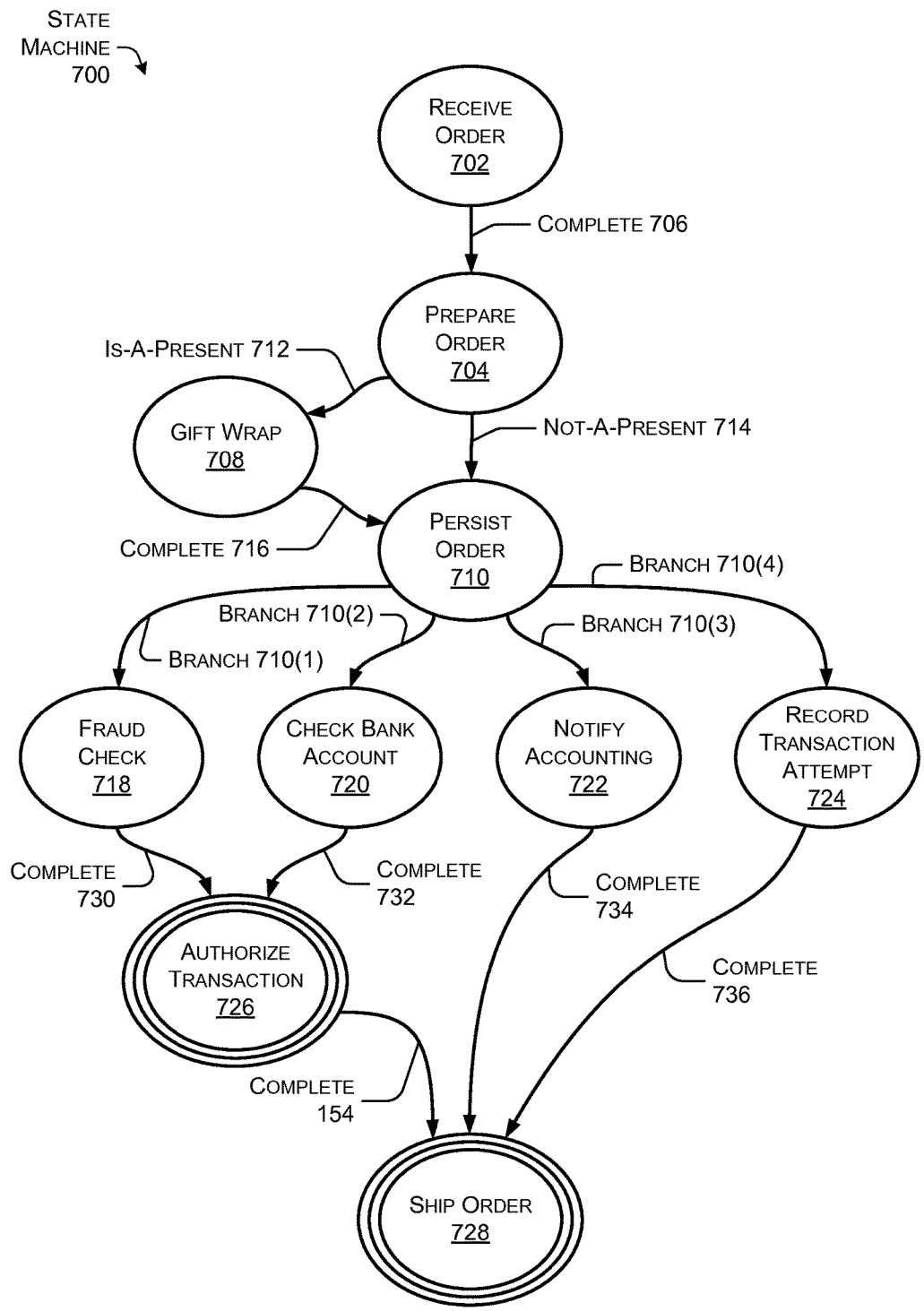
FIG. 7 is a flow diagram illustrating features of an example state machine for a workflow definition for a workflow according to some implementations.

FIG. 7 illustrates an example state machine, state machine 700, corresponding to a workflow, such as a workflow defined according to a workflow definition. In this example, the workflow includes multiple states and different types of transitions in between states. In other examples, different numbers, different types, and different types of transitions may be specified in defining a workflow. As discussed above, in some embodiments, a workflow definition may be specified according to a domain specific language for defining the states, transitions, and tasks of a state machine for a workflow.

In this example, a workflow may be defined to perform order fulfillment services. For example, the first state of a state machine for the workflow may be defined to be receiving an order, as depicted at 702. With regard to the workflow handling service described above with regard to FIGS. 1-6, state machine 700 specified within a workflow definition for a workflow may be received and validated by front end 110 of the workflow service. The front end, based on validating the workflow definition, may call the workflow handling service to start the workflow. The workflow, in turn, may then send a request for a workflow decision for the workflow to the workflow evaluation service, where the workflow log for the workflow may be empty of any completed tasks, but may include a record of an indication to start the workflow. After sending the request for the workflow decision, the workflow handling service may then wait for a next request to advance or start a workflow until it receives the workflow decision.

In some cases, a single state of a state machine for a workflow may be specified according to a domain specific language to be a state module that includes one or more tasks, an identification of one or more resources for performing the one or more tasks, and one or more transitions or branches to other states. Together, the individually defined states may be interpreted as a whole to specify the operations to be executed in servicing a workflow.

In this example, a first state of the state machine for the workflow, receive order 702, may specify using a domain specific language that a task to be performed uses a resource provided by a particular service, and that upon completion of the task, receive order 702 state transitions to prepare order 704 state. In this example, completion of the task for the receive order 702 state is indicated by complete 706.

Again, with regard to the workflow handling service and the workflow evaluation service, after the workflow evaluation service receives the request for a workflow decision, the workflow evaluation service may, as depicted in FIG. 4, allocate computing resources for a workflow evaluation thread to determine the workflow decision. Once initiated, the workflow evaluation thread may access the workflow definition that specifies the state machine for the workflow and construct the state machine. Given a constructed state machine, in this case state machine 700, the workflow evaluation thread may determine the first state and access the workflow log to traverse through the state based on events logged in the workflow log until a current state of the state machine is reached.

In this example, given the constructed state machine and a workflow log for the workflow indicating that no tasks have been completed for the state machine, the workflow evaluation thread may determine that the current state is receive order 702. Further, the workflow evaluation thread may use the workflow definition to determine that given the current state of receive order 702, that the workflow decision should be to perform a task indicated by the state module for the receive order 702 state. This workflow decision may be provided to the workflow handling service for scheduling of the task.

At a later time, when a notification corresponding to a completion of the task for the receive order 702 state is received by the workflow handling service, the workflow handling service may again request a workflow decision from the workflow evaluation service. At this point, the first task of the workflow for fulfilling an order may be completed.

In response to receiving a request to advance to the workflow, the workflow handling service may again send a request for a workflow decision to the workflow evaluation service. The workflow evaluation service may repeat the process for handling a request for a workflow decision. However, at this point, the workflow evaluation thread that is created accesses the same workflow definition as the first workflow evaluation thread, but the workflow log may include a record of the first task having been completed. Accordingly, after constructing state machine 700, the workflow evaluation thread may end up a current state of prepare order 704 based on the workflow log indicating that the task for receive order 702 having been completed.

Given that each workflow evaluation thread uses the workflow definition and workflow log to determine a current state, there is no data flow from one workflow evaluation thread to a subsequent workflow evaluation thread, thereby allowing each subsequent workflow evaluation thread to be scheduled to execute on different computing resources without any negative computational impact. Further, such scheduling allows a load balancer the flexibility to deploy any computing resources without regard to which resource was previously used to process a workflow decision request. Further still, given that each workflow evaluation thread may independently determine a current state for a state machine, the load balancer may use any factors to determine the computing resources to be deployed. Including, for example, workloads on a given host, price constraints in a client contract for provider services, performance requirements specified in a client contrast for provider services, or a combination of factors, including other factors.

At this point in the workflow, the workflow handling service may receive a workflow decision for the workflow and schedule a corresponding task for the prepare order 704 state. In this example, depending on whether or not the order is a gift, the workflow evaluation service may provide the workflow handling service with a workflow decision corresponding to a task to gift wrap the order or the persist the order, as depicted at gift wrap 708 and persist order 710. Further, the transitions between prepare order 704 and gift wrap 708 is depicted by is-a-present 712, and the transition between prepare order 704 and persist order 710 is depicted by not-a-present 714. The transition in between the gift wrap 708 state and the persist order 710 state is depicted by complete 716.

From the persist order 710 state, the workflow evaluation service may determine that there four tasks to schedule as part of a workflow decision for the four branches from the persist order 710 state, branches 710(1)-710(4). Accordingly, the workflow handling service may schedule for execution tasks corresponding, respectively, fraud check 718, check bank account 720, notify accounting 722, and record transaction attempt 724.

In this example, when the task corresponding to the fraud check 718 state completes, the workflow handling service is called, which requests a workflow decision from the workflow evaluation service. In this example, the workflow evaluation thread may reach the authorize transaction 726 state, but the authorize transaction 726 state may specify that both the fraud check 718 task or tasks and the check bank account 720 task or tasks are to be completed before tasks for the authorize transaction 726 state are performed. The transition between the fraud check 718 state and the authorize transaction 726 state is depicted by complete 730, and the transition between the check bank account 720 state and the authorize transaction 726 state is depicted by complete 732.

Therefore, in this example, the workflow evaluation thread may return to the workflow evaluation service a workflow decision to do nothing. However, when the workflow handling service is called due to check bank account 720 task or tasks being completed, the workflow evaluation thread may determine that preconditions for executing have been satisfied, and generate a workflow decision corresponding to authorization of the transaction, as depicted at 726.

Similarly, the ship order 728 state may not have any corresponding tasks execute until tasks corresponding, respectively, to authorize transaction 726, notify accounting 722, and record transaction attempt 724 have completed. The transition between the notify accounting 722 state and the ship order 728 state is depicted by complete 734, and the transition between the record transaction attempt 724 state and the ship order 728 state is depicted by complete 736.

In this way, a workflow service may process the workflow corresponding to state machine 700, and correspondingly, fulfill an order.

Figure 8:
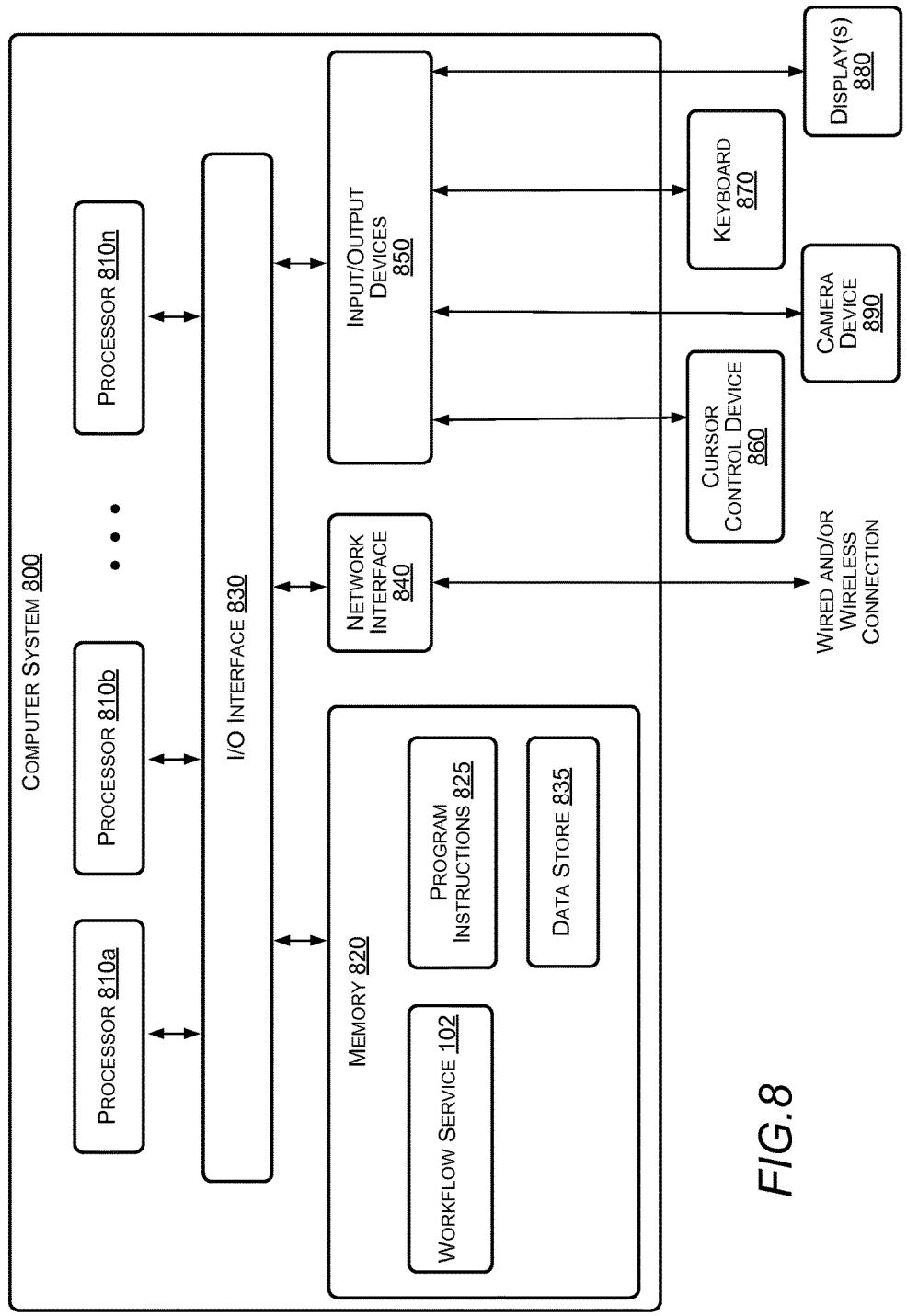
FIG. 8 illustrates a computer system including an implementation of a workflow service according to some implementations.

FIG. 8 illustrates an example computer system, computer system 800, where computer system 800 may be configured to implement different workflow service implementations, according to the discussed embodiments and examples. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device. Generally, the methods described herein may in various embodiments be implemented by any combination of hardware and software.

Further, the methods described herein may in various embodiments be implemented by any combination of hardware and software. For example, the methods may be implemented by computer system 800 that includes one or more processors executing program instructions stored on a computer-readable storage medium coupled to the processors. The program instructions may be configured to implement the functionality described herein (e.g., the functionality of various servers and other components that implement the look-up component described herein). The various methods as illustrated in the figures and described herein represent example embodiments of methods. The order of any method may be changed, and various elements may be added, reordered, combined, omitted, or modified.

Computer system 800 includes one or more processors 810*a*-810*n* (any of which may include multiple cores, which may be single or multi-threaded) coupled to a system memory 820 via an input/output (I/O) interface 830. Computer system 600 further includes a network interface 840 coupled to I/O interface 830. In various embodiments, computer system 800 may be a uniprocessor system including one processor, or a multiprocessor system including several processors (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. The computer system 800 also includes one or more network communication devices (e.g., network interface 840) for communicating with other systems and/or components over a communications network (e.g. Internet, LAN, etc.). For example, a client application executing on system 800 may use network interface 640 to communicate with a server application executing on a single server or on a cluster of servers that implement one or more of the components of the systems described herein. In another example, an instance of a server application executing on computer system 800 may use network interface 840 to communicate with other instances of the server application (or another server application) that may be implemented on other computer systems. Further, computer system 800, via I/O interface 830, may be coupled to one or more input/output devices 850, such as cursor control device 860, keyboard 870, camera device 890, and one or more displays 880.

In the illustrated embodiment, computer system 800 also includes one or more persistent storage devices and/or one or more I/O devices 850. In various embodiments, persistent storage devices may correspond to disk drives, tape drives, solid state memory, other mass storage devices, or any other persistent storage device. Computer system 800 (or a distributed application or operating system operating thereon) may store instructions and/or data in persistent storage devices, as desired, and may retrieve the stored instruction and/or data as needed. For example, in some embodiments, computer system 800 may host a storage system server node, and persistent storage may include the SSDs attached to that server node.

Computer system 800 includes one or more system memories 820 that are configured to store instructions and data accessible by processor(s) 810. In various embodiments, system memories 820 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 820 may contain program instructions 825 that are executable by processor(s) 810 to implement the methods and techniques described herein. In various embodiments, program instructions 825 may be encoded in platform native binary, any interpreted language such as Java™ bytecode, or in any other language such as C/C++, Java™, etc., or in any combination thereof. For example, in the illustrated embodiment, program instructions 825 include program instructions executable to implement the functionality of a database service, tracking-enabled client, update tracker, update listener, and/or update consumer in different embodiments. In some embodiments, program instructions 825 may implement multiple separate clients, server nodes, and/or other components.

In some embodiments, program instructions 825 may include instructions executable to implement an operating system (not shown), which may be any of various operating systems, such as UNIX, LINUX, Solaris™, MacOS™, Windows™, etc. Any or all of program instructions 825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 840.

In some embodiments, system memory 820 may include data store 835, which may be configured as described herein. In general, system memory 820 (e.g., data store 835 within system memory 820), persistent storage, and/or remote storage may store data blocks, replicas of data blocks, metadata associated with data blocks and/or their state, configuration information, and/or any other information usable in implementing the methods and techniques described herein. Further, data store 820 may include modules for implementing an active content filter 110 in an embodiment of a static content endpoint server.

In one embodiment, I/O interface 830 may be configured to coordinate I/O traffic between processor(s) 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor(s) 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor(s) 810.

Network interface 840 may be configured to allow data to be exchanged between computer system 800 and other devices attached to a network, such as other computer systems (which may implement one or more storage system server nodes, database engine head nodes, and/or clients of the database systems described herein), for example. In addition, network interface 840 may be configured to allow communication between computer system 800 and various I/O devices 850 and/or remote storage. Input/output devices 850 may, in some embodiments, include one or more display terminals, keyboards, keypads, touchpads, scanning devices, voice or optical recognition devices, or any other devices suitable for entering or retrieving data by one or more computer systems 800. Multiple input/output devices 850 may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol. In various embodiments, computer system 800 may include more, fewer, or different components than those illustrated (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a workflow data store configured to store workflow definitions registered with the workflow service by respective clients, wherein respective workflow definitions define states of a respective workflow indicating tasks to be performed for the respective workflow and transitions between the states;
a workflow handling service implemented by one or more computing devices comprising respective processors and memory and configured to:
maintain workflow logs for respective workflows; and
request a workflow decision for a particular workflow of the respective workflows to determine a task to schedule for the respective workflow; and
a workflow evaluation service implemented by one or more computing devices comprising respective processors and memory and configured to:
receive a request for the workflow decision for the particular workflow, wherein the request includes a workflow log for the particular workflow;
generate a state machine for the particular workflow according to a particular workflow definition for the particular workflow;
apply the workflow log for the particular workflow to the state machine to transition the state machine to a current state for the particular workflow;
evaluate the current state for the particular workflow to determine the workflow decision for the particular workflow; and
send the workflow decision for the particular workflow to the workflow handling service;
wherein the workflow handling service is further configured to:
receive the workflow decision from the workflow evaluation service;
log the workflow decision in the workflow log for the particular workflow; and
schedule for execution a task corresponding to the workflow decision.

2. The system of claim 1, wherein the workflow evaluation service is further configured to:
allocate computing resources in response to receiving the request for the workflow decision, wherein the generate the state machine, the apply the workflow log, the evaluate the current state, and the send of the workflow decision are performed on the allocated computing resources; and
unallocate the allocated computing resources for usage after the generate the state machine, the apply the workflow log, the evaluate the current state, and the send of the workflow decision are completed on the allocated computing resources.

3. The system of claim 2, wherein the workflow evaluation service is further configured to:

while the workflow decision for the particular workflow is being determined:
receive another request for a workflow decision for another workflow;
generate another state machine for the other workflow according to a workflow definition for the other workflow from the workflow data store;
apply the workflow log for the other workflow to the other state machine to transition the other state machine to a current state for the other workflow;
evaluate the current state for the other workflow to determine the workflow decision for the other workflow; and
send the workflow decision for the other workflow to the workflow handling service.

4. The system of claim 1, wherein the workflow evaluation service comprises a host computer comprising a local cache configured to store the workflow definition for the particular workflow, and wherein the workflow evaluation service accesses the workflow definition for the particular workflow from the local cache if the workflow definition for the particular workflow is stored in the local cache.

5. The system of claim 4, wherein the workflow service comprises a cache service, wherein the cache service is configured to store the workflow definition for the particular workflow, and wherein, if the workflow definition is not stored in the local cache, the workflow evaluation service accesses the workflow definition from the cache service if the workflow definition is stored in the local cache, and wherein if the workflow definition is not stored by the cache service, then the workflow service accesses the workflow definition from the workflow data store.

6. A method for a workflow evaluation service, comprising:
performing, by instructions executed on one or more processors:
receiving a request for a workflow decision for a workflow, wherein the request specifies a workflow log of events for the workflow, wherein the workflow is associated with a workflow definition including states of the workflow, tasks to be performed, and transitions between the states; and
allocating computing resources for executing a workflow evaluation thread, wherein the workflow evaluation thread is configured to perform:
generating a state machine for the workflow according to the workflow definition;
transitioning the state machine to a current state for the workflow based at least in part on the workflow log;
evaluating the current state for the workflow to determine the workflow decision for the workflow; and
providing the workflow decision in response to the request.

7. The method of claim 6, further including deallocating the computing resources, and wherein the workflow evaluation thread terminates after the workflow decision for the workflow is determined and provided.

8. The method of claim 6, wherein the method further comprises:
receiving another request for another workflow decision for the workflow, wherein the other request specifies an updated workflow log; and
allocating different computing resources for executing another workflow evaluation thread, wherein the other workflow evaluation thread is configured to perform:

generating the state machine for the workflow according to the workflow definition;
transitioning the state machine to an updated current state for the workflow based at least in part on the workflow log;
evaluating the updated current state for the workflow to determine another workflow decision for the workflow; and
providing the other workflow decision in response to the other request.

9. The method of claim 6, further comprising:
receiving, via a client interface of a workflow service of a provider network, a plurality of different workflow definitions;
validating the plurality of different workflow definitions; and
using the workflow service of the provider network to process a plurality of workflows associated with the workflow definitions.

10. The method of claim 9, wherein the workflow service includes a workflow handling service configured to perform:
receiving a task completion event corresponding to the workflow;
sending the request for the workflow decision for the workflow, wherein the request is a non-blocking request;
receiving the workflow decision; and
scheduling a task for execution, wherein the task corresponds to the workflow decision.

11. The method of claim 10, wherein the workflow handling service is further configured to perform:
receiving another task completion event for another workflow;
after the sending the request for the workflow and before the receiving the workflow decision:
sending another request for another workflow decision for the other workflow;
receiving the other workflow decision; and
scheduling another task for execution, wherein the other task corresponds to the other workflow decision.

12. The method of claim 10, wherein the workflow service comprises a load balancer, and wherein the workflow service is configured to perform:
receiving a plurality of requests for workflow decisions;
wherein the load balancer is configured to perform:
determining, for a respective request of the plurality of requests for workflow decisions, a respective computing resource; and
creating and executing, on the respective computing resource, a respective workflow evaluation thread to determine a respective workflow decision for the respective request of the plurality of requests for workflow decisions.

13. The method of claim 6, wherein the applying the workflow log comprises:
accessing a checkpoint for the workflow from a checkpoint data store, wherein the checkpoint defines a state of the state machine for the workflow up to a particular point in the workflow;
applying the checkpoint to the state machine to reach a particular state of the state machine; and
applying one or more events from the workflow log from a point in the workflow log corresponding to the checkpoint up to a most recent event in the workflow log to transition the state machine from the particular state of the state machine to the current state for the state machine for the workflow.

14. A non-transitory, computer-readable storage medium storing program instructions that when executed on one or more hardware processors configure a workflow evaluation service to:
receive a request for a workflow decision for a workflow, wherein the request specifies a workflow log of events for the workflow, wherein the workflow is associated with a workflow definition including states of the workflow, tasks to be performed, and transitions between the states; and
allocate computing resources for executing a workflow evaluation thread, wherein the workflow evaluation thread is configured to:
generate a state machine for the workflow according to the workflow definition;
transition the state machine to a current state for the workflow based at least in part on the workflow log;
evaluate the current state for the workflow to determine the workflow decision for the workflow; and
provide the workflow decision in response to the request.

15. The non-transitory, computer-readable storage medium of claim 14, wherein the workflow evaluation thread terminates after the workflow decision for the workflow is determined and provided, and wherein the computing resources allocated for the workflow evaluation thread are deallocated after the workflow evaluation thread terminates.

16. The non-transitory, computer-readable storage medium of claim 14, wherein the program instructions are further executable on one or more hardware processors to:
receive another request for another workflow decision for the workflow, wherein the other request specifies an updated workflow log; and
allocate different computing resources for executing another workflow evaluation thread, wherein the other workflow evaluation thread is configured to:
generate the state machine for the workflow according to the workflow definition;
transition the state machine to an updated current state for the workflow based at least in part on the workflow log;
evaluate the updated current state for the workflow to determine another workflow decision for the workflow; and
provide the other workflow decision in response to the other request.

17. The non-transitory, computer-readable storage medium of claim 16, wherein the workflow service includes a workflow evaluation service configured to perform the receive, the allocate, the generate, the apply, the evaluate, and the provide, and wherein the workflow service includes a workflow handling service configured to:
receive a task completion event corresponding to the workflow;
send the request for the workflow decision for the workflow, wherein the request is a non-blocking request;
receive the workflow decision; and
schedule a task for execution, wherein the task corresponds to the workflow decision.

18. The non-transitory, computer-readable storage medium of claim 17, wherein the workflow handling service is further configured to:
receive a another task completion event for a another workflow;
after the send of the request for the workflow and before the receive of the workflow decision:

send another request for a another workflow decision for the other workflow;

receive the other workflow decision; and schedule another task for execution, wherein the other task corresponds to the other workflow decision.

19. The non-transitory, computer-readable storage medium of claim 17, wherein the workflow service comprises a load balancer, and wherein the workflow service is configured to:

receive a plurality of requests for workflow decisions;

wherein the load balancer is configured to:

determine, for a respective request of the plurality of requests for workflow decisions, a respective computing resource; and create and execute, on the respective computing resource, a respective workflow evaluation thread to determine a respective workflow decision for the respective request of the plurality of requests for workflow decisions.

20. The non-transitory, computer-readable storage medium of claim 14, wherein to apply the workflow log, the program instructions are further executable on one or more hardware processors to:

receive, via a client interface of a workflow service of a provider network, the workflow definition;

validate the workflow definition;

use the workflow service of the provider network to process the workflow according to the workflow definition, wherein the workflow service comprises the workflow evaluation service;

receive, via the client interface of the workflow service of the provider network, an updated version of the workflow definition;

validate the updated version of the workflow definition; and while the workflow service of the provider network processes the workflow according to the workflow definition, use the workflow service of the provider network to process a workflow according to the updated version of the workflow definition.

\* \* \* \* \*